US005355553A

United States Patent [19]

Mahoney

[11] Patent Number: 5,355,553

[45] Date of Patent: Oct. 18, 1994

[54] ADJUSTABLE HANDLE FOR A HAND IMPLEMENT

[76] Inventor: Frederick G. Mahoney, 102 W. Ninth St., Pittsburgh, Pa. 15215

[21] Appl. No.: 964,255

[22] Filed: Oct. 21, 1992

[51] Int. Cl.[5] .................... A47B 95/02; A47J 45/10; E05B 1/00

[52] U.S. Cl. .................... 16/112; 16/114 R; 15/176.3

[58] Field of Search .......... 16/112, 114 R; 411/383, 411/908; 403/209, 57, 78; 15/144.1, 144.2, 172, 176.3

[56] References Cited

U.S. PATENT DOCUMENTS

| | | | |
|---|---|---|---|
| 195,325 | 9/1877 | Bailey | 16/112 |
| 877,390 | 1/1908 | Wille | 411/383 |
| 2,617,663 | 11/1952 | Carlton | 280/158 |
| 2,732,578 | 1/1956 | Hawkins | 15/176.3 |
| 2,887,710 | 5/1959 | Mahoney | 15/172 |
| 2,890,845 | 6/1959 | Kiekhaefer | 411/908 |
| 3,384,141 | 5/1968 | Kost | 411/908 |
| 4,507,831 | 4/1985 | McClure | 403/209 |
| 4,727,618 | 3/1988 | Mahoney | 15/172 |

*Primary Examiner*—Carmine Cuda

*Attorney, Agent, or Firm*—J. Stewart Brams

[57] ABSTRACT

A hand implement having an adjustable handle which is selectively movable by operation of improved retention devices therefor to any of a variety of use positions, each of which corresponds to a handle position perpendicular to one of a plurality of abutment faces formed on an implement base portion and located in non-parallel planes.

8 Claims, 2 Drawing Sheets

ADJUSTABLE HANDLE FOR A HAND IMPLEMENT

BACKGROUND OF THE INVENTION

This invention relates generally to holders for hand implements such as paint brushes and more particularly to a hand implement holder that provides for the positioning of the implement handle at different angles relative to the working portion of the implement.

A hand implement may be provided with an adjustable handle that can be positioned at different relative angles with respect to the working portion, for example the bristle head of a paint brush. It is known to provide a plurality of angularly disposed faces on a holder, each face having a threaded hole or socket that is plugged with a screw or similar plug means when not in use. When the plug is removed, a threaded stem of the implement handle is engaged in the socket. This structure permits the handle to be disposed at different relative angles to the working part of the implement, but the handle receiving holes or threaded sockets can become fouled, as with paint, if the plugs or screw are not inserted in the unused sockets. The sockets thus may easily become clogged and unusable, and defeat the purpose of the adjustable tool handle.

Also known is a ball and socket arrangement wherein an implement handle member may be shifted through a slot and secured at any of several angular positions.

U.S. Pat. No. 2,887,710 discloses an implement holder that is provided with a plurality of flat faces connected by slots. A handle is attached to a stem as by threaded engagement, and the stem is pivotally secured within the holder so that it may swing within any selected one of the slots on the holder and be secured rigidly adjacent a respective flat clamping face. A user thus can shift the handle to a selected relative position with respect to the holder by loosening the handle sufficiently to clear the perimeter of the flat face on which it had been engaged and passing the handle to an adjacent face while still attached to the handle stem. A pivotal or flexible joint at the inner end of the stem permits the stem to be shifted angularly to any one of the slots in the flat clamping faces on the implement holder. The threaded engagement of the handle on the stem permits unscrewing or backing off the handle by rotation thereof to allow it to pass over the abutments formed by the margins of the flat clamping faces. When the stem is placed in its new selected position, the handle may be tightened by reverse rotation of the handle with respect to the threaded stem until it has traversed sufficiently axially along the threaded stem that it engage the corresponding face and is locked in position with respect to that face. Thus, the single stem may be adjusted into alignment with any of a number of faces on the holder.

U.S. Pat. No. 4,727,618 discloses another implement handle pivotal connection including a handle stem which is pivotally retained with respect to an implement holder by an oblong retention ball member having its major axis oriented preferably at an angle of 90° to the axis of the stem and the attached implement handle.

In either of the identified prior patents, the clamping faces on the implement head form a frustrum of a generally asymmetrical pyramid to provide multiple side or lateral faces and a top face. Further, the lateral clamping faces are set at different angles to the implement axis to provide different angular positions of the handle relative to the implement, and each clamping face is preferably flat and has a perimeteral edge thereof forming an abutment which requires the handle to be loosened for adjustment thereof to a different position.

BRIEF SUMMARY OF THE INVENTION

The present invention concerns an improvement over the above described and other prior art. Specifically, the present invention contemplates an implement and an adjustable handle assembly therefor including a preferably elongated handle with a stem that is pivotally retained with respect to an implement head for selective adjustment of the handle to any of a plurality of use positions defined by engagement faces formed preferably as surfaces of a frustrum of a pyramid.

The improved pivot connection and stem assembly of my instant invention contemplates an open hook-eye formed at one of an improved connecting stem assembly, and a plastic thread plug molded onto an opposed end of the stem assembly to be received in a threaded, axial bore formed in the handle member. The open hook-eye encloses a pivot rod or pin which is received in a formed recess in the tool head body, and corresponding slots or recess accommodate pivotal movement of the stem about the pivot rod as the implement handle is selectively moved among the various use positions.

The invention also contemplates a multi-part tool head assembly of molded plastic or similar material which, when assembled, forms the tool head, including the pyramidal frustrum with surfaces defining the available tool handle positions specified interior recesses or cavities to receive and retain the tool handle stem and pivot rod assembly.

The improved handle stem structure and tool head or base structure, as characterized, provide the advantages of decreased manufacturing cost through reduced cost of component parts and improved ease and efficiency of assembly, as well as enhanced implement reliability, durability and service.

It is therefore one object of this invention to provide an improved adjustable handle implement.

A more specific object of the invention is to provide a hand implement with an adjustable handle including an improved stem adjustment assembly for retention of the handle with respect to a tool head or base through a pivot connection with a pivot element received within the tool head upon assembly of a pair of mating tool head elements.

These and other objects and further advantages of the invention will be more readily understood upon consideration of the following detailed description and the accompanying drawings wherein.

Figure 1:
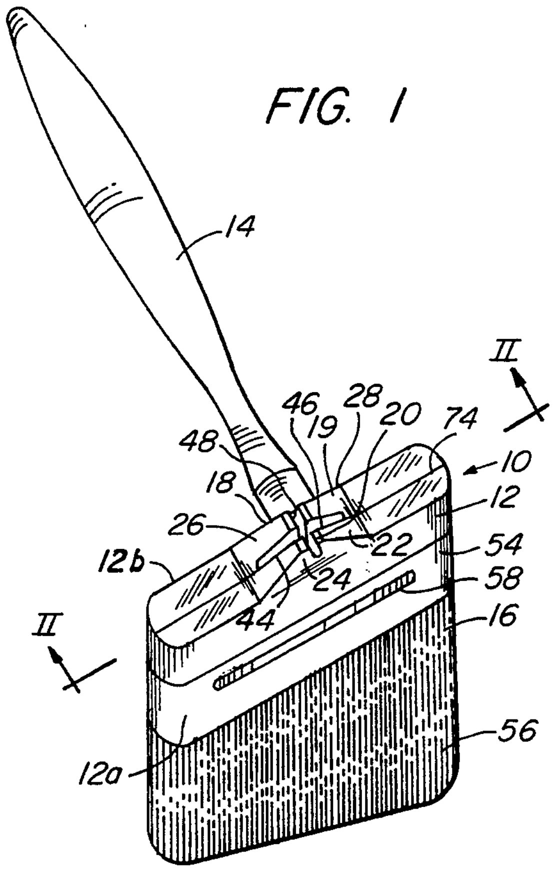
FIG. 1 is a perspective view of an implement holder of the present invention.
Figure 2:
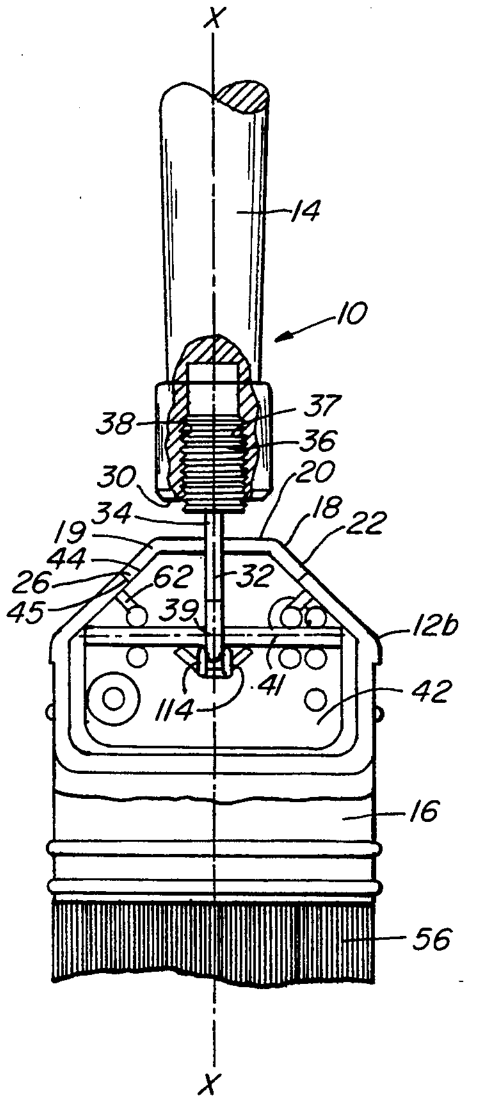
FIG. 2 is a fragmentary sectional view taken on line II—II of FIG. 1 showing interior portions of one of the two mating parts of the tool head.

There is generally indicated at 10 in FIGS. 1 and 2 an implement in the form of a paint brush having a base portion 12 to which are adjustably affixed a preferably elongated handle 14 and a bristle head 16 which carries bristles 56. For ease of manufacture, base 12 may be of molded plastic, for example.

Implement 10 is provided with a handle connection portion 18 located centrally atop base 12. Connection portion 18 may take the form of a frustrum of a pyramid 19 having a top planar surface 20 which is perpendicular to axis X—X of the implement 10 (FIG. 2), and a plurality of planar flank surfaces 22, 24, 26 and 28, selected ones of which may be disposed at different angles with respect to axis X—X to form the irregular pyramidal frustrum 19. In particular, one such side surface, such as surface 28 for example, may be disposed in a plane which extends generally parallel to axis X—X. The surfaces 20, 22, 24, 26 and 28 provide engagement surfaces against which the butt end surface 30 of handle 14 may be engaged by a novel clamping mechanism as described hereinbelow to dispose the handle 14 selectively at any of a variety of relative angular use positions with respect to axis X—X. In each use position, the axis of handle 14 preferably extends perpendicularly to the respective surface 20, 22, 24, 26 or 28.

Figure 3:
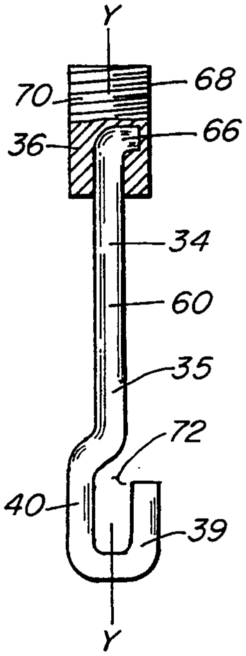
FIG. 3 is an enlarged side elevation, partially broken away, showing details of the tool handle stem assembly of FIG. 2.

In order to secure handle 14 with respect to base 12, a connector assembly 32 is provided (FIGS. 2 and 3). Connector assembly 32 comprises an elongated stem 34 having a threaded end portion 36 which is received in threaded engagement within an axial blind bore 38 extending into handle 14 from end surface 30 thereof. The opposed end 39 of stem 34 is formed as an open hook-eye 40 which encloses an elongated pivot or retained rod 41.

The engagement of hook-eye 40 with rod 41 forms a universal pivot connection for retention of handle 14 and stem assembly 34 with respect to the rod 41 when rod 41 is assembled with base 12 as described hereinbelow.

A generally hollow interior pocket portion 42 is formed in base 12 to provide clearance through which stem portion 34 extends outwardly of base 12 via a cross slot opening 44 (FIG. 1) which communicates between pocket 42 and the exterior of base 12. More specifically, cross slot opening 44 includes mutually perpendicular slots 46 and 48. Slot 46 is disposed in a plane perpendicular to surfaces 26 and 22, and parallel to axis X—X. Similarly, slot 48 extends in a plane which is perpendicular to faces 24 and 28 and also perpendicular to the plane of slot 46. Each slot 46 and 48 extends from pocket portion 42 outward such that stem 34, when retained with respect to base 12 by rod 41, may be pivoted to a perpendicular orientation with respect to any of surfaces 20, 22, 24, 26 or 28.

Accordingly, handle 14 may be secured to stem assembly 34 in a manner that, by selectively adjusting handle 14 on stem 34 the handle butt end surface 30 may selectively engage or disengage any of faces 20, 22, 24, 26 or 28 to thereby assume any of a variety of angular positions with respect to base 12. When handle 14 is tightly engaged, butt end surface 30 contacts one of the specified faces 20, 22, 24, 26 and 28, in compressive abutment thus maintaining stem assembly 34 in tension between handle 14 and retention rod 41. Further, since hook-eye 40 is free to slide on rod 41, the tensioning of stem assembly 34 as described may also pull a longitudinally extending portion 60 of stem 34, located intermediate threaded portion 36 and hook-eye 40, tightly into abutting engagement with an interior flank surface of the respective slot in which stem 34 extends, for example surface 62 of slot 44 (FIG. 2). Alternatively, the interior flank surface which limits pivotal movement of the stem 34 within a given slot may be a lowermost extent of the respective slot such as shown at 45 for slot 44 in FIG. 2. Surface 62, or the alternative surface 45, extends generally perpendicular to the respective surface 26 in order to help ensure stem portion 60 will be aligned with respective surface 62 or 45 and firmly engaged therewith substantially throughout the length of the surface 62 or 45.

In similar fashion, lowermost abutment surfaces may extend generally perpendicular to others of faces 20, 22, 24 and 28. The described lowermost surfaces thus cooperate with the respective faces 20, 22, 24, 26 and 28 to form contact abutments which assist in preventing handle 14, when tightly engaged in a selected position, from shifting or moving from the selected position. Thus, a rigid yet readily adjustable implement holder structure is provided.

Stem 34 is formed as an elongated, rigid stem member (FIG. 3) from steel wire, for example wire stock of approximately 0.105 inch diameter although wire diameters in a range of 0.075 inches to 0.125 inches, as well as larger or smaller wire gauges are considered suitable. Further, the wire stock for stem 34 should be of sufficient hardness and strength that portions of hook-eye 40 which engage rod 41 will not deform under the tension loads applied by engagement of handle surface 30 in abutting engagement on one of the base surfaces described hereinabove, so that the hook portion 40 will not be pulled open by tension forces imposed thereon by its engagement with rod 41. If hook-eye portion 40 were to be pulled open under such tension loads, the opposed sides of the hook-eye portion 40 could spread sufficiently to take up the clearance available within pocket 42 and cause interference and resistance to pivotal movement of the stem 34.

The end of stem 34 opposed to hook-eye portion 40 includes an interlocking end portion 66 which is turned at an angle, for example a 90° angle, to the axis Y—Y of stem 34, as shown in FIG. 3. Interlocking end portion 66 is so formed to interlock with a molded, preferably plastic threaded plug 68 which forms the threaded end portion 36 described hereinabove. Plug 68 is molded onto end portion 66 with integral external threads 70 molded thereon. Threads 70 are engageable with internal threads 37 formed within bore 38 for retention and axial adjustment of stem 34 with respect to handle 14. The mechanical interlocking provided by formed end portion 66 of stem 34 precludes both relative axial rotation and axial translation of molded thread plug 68 with respect to wire stem 34.

As noted hereinabove, hook-eye portion 40 is an open eye having a gap 72 which preferably is just marginally smaller than the diameter of rod 41 so that stem 34 may be readily assembled to rod 41 by merely slipping the rod 41 laterally through gap 72. Alternatively, gap 72 may be narrower so that stem 34 is assembled with rod 41 by passing one end of rod 41 axially through hook-eye portion 40.

As noted hereinabove, base 12 may preferably be a pair of mating base elements as indicated at **12*a* and 12*b* which mate on a junction plane 74 (FIG. 1). Preferably, although exterior portions of the base elements 12*a* and 12*b* are not identical (because surfaces 20, 22, 24, 26 and 28 are disposed at different angles with respect to axis X—X) interior portions of the elements 12*a* and 12*b* may be essentially identical as shown in FIGS. 2 and 4**.

Figure 4:
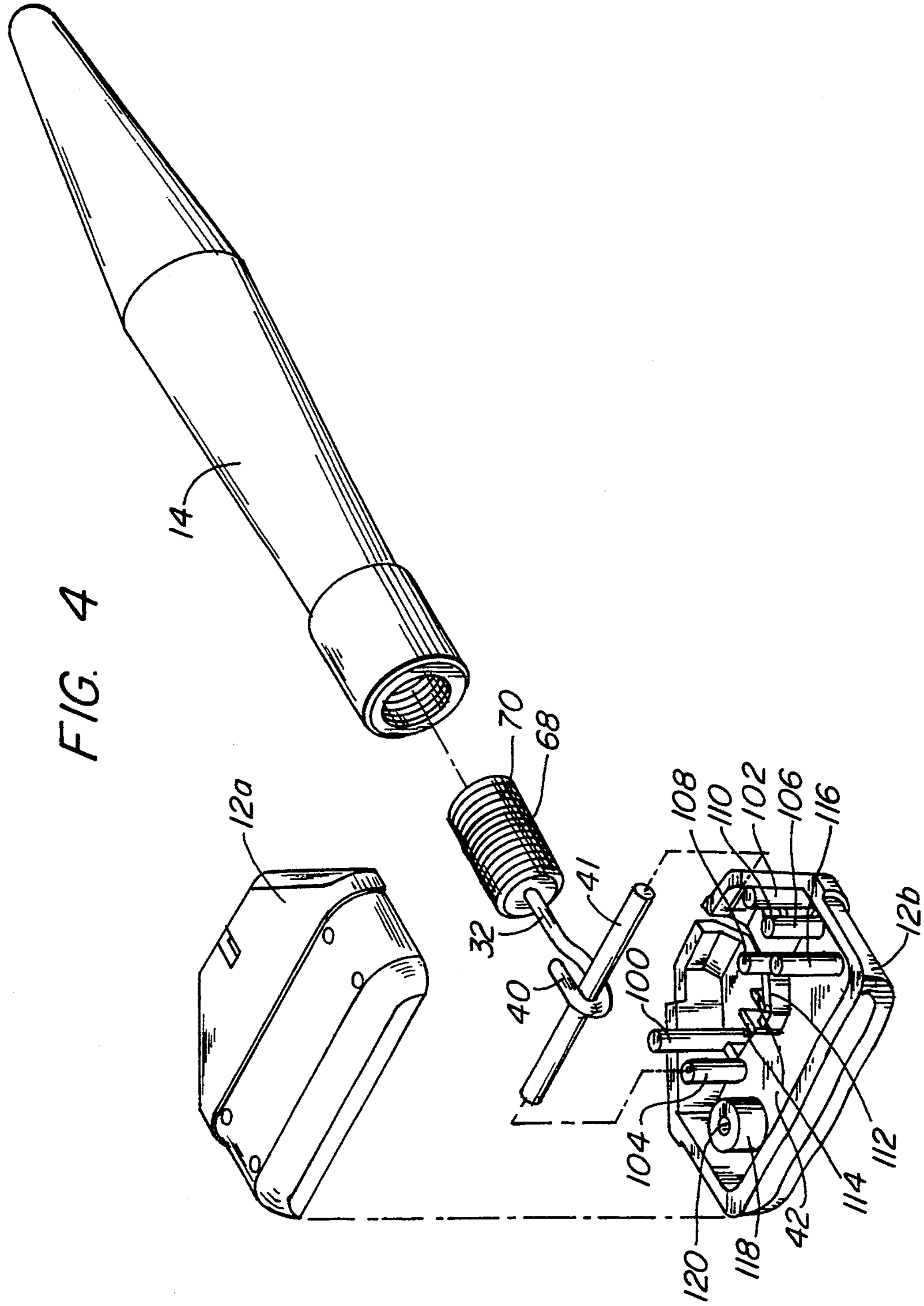
FIG. 4 is an exploded perspective view showing details of the tool handle, stem and head assembly.

More specifically with reference to FIG. 4, there is shown an exploded representation of base elements **12*a*** and 12*b* positioned for mutually mating interengagement to trap and retain rod 41 with the hook-eye portion 40 of stem assembly 32 assembled thereto. Also as shown, handle 14 is positioned for threaded engagement upon threads 70 of plug 68 as above described.

As noted, elements 12*a* and 12*b* may have generally hollowed out interior or recess portions 42 which are essentially identical, and hence only one of such interior portions 42 is shown in FIG. 4. Within the hollowed interior portion 42 is an arrangement of integrally molded interengaging elements including a first upper rod retaining pin 100, a second upper rod retaining pin 102 spaced laterally from pin 100, a first lower rod retaining pin 104 spaced from pin 100, a second lower rod retaining pin 106 similarly spaced from pin 102, and a third lower rod retaining pin 108 spaced laterally from pin 106. Alternatively, the various specified pins may be more generally regarded as elongated projections. An integrally formed boss 110 includes an opening to receive the corresponding pin 100 of element 12*a*.

Accordingly, when elements 12*a* and 12*b* are mated in the configuration shown, pin 100 of element 12*a* is inserted into and interlocked within the opening of boss 110 in element 12*b*, and pin 104 of element 12*a* resides laterally intermediate the pins 108 and 106 of element 12*b*. Similarly, it will be seen that the pin 100 of element 12*b* is received within the opening in boss 110 of element 12*a* and pin 104 of element 12*b* resides laterally between the pins 106 and 108 of element 12*a*. The assembled structure thus provides retention structure in recess 42 to retain and secure rod 41 between the assembled elements 12*a* and 12*b* as follows. Two laterally spaced pins 100 extend from the opposed elements 12*a* and 12*b*, respectively, and are engaged the respective openings of bosses 110 of the other element 12*b* and 12*a*, respectively. The pins 100 thus provide support on the upper side of the rod 41. Pins 102 extend outwardly of the respective elements 12*a* and 12*b* toward the opposed element 12*b* or 12*a* to provide additional support on the upper side of rod 41 in the manner of a cantilever beam laterally adjacent to the respective pins 100.

On the lower side of rod 41, adjacent each end thereof, a pair of pins 106 and 108 extend outwardly of elements 12*a* and 12*b*, respectively, to provide support beneath rod 41 in the manner of a cantilever beam, and a corresponding pin 104 extends outwardly of the other member 12*b* or 12*a* intermediate the corresponding pins 106 and 108 to provide similar lower support for rod 41 in the manner of a cantilever beam.

The retention structure for rod 41 between elements 12*a* and 12*b* thus contemplates a multiplicity of upper and lower projections which extend outward of the respective members 12*a* and 12*b* adjacent each longitudinal end of the rod 41 to support the rod 41 with respect to the elements 12*a* and 12*b*. At each end of the rod 41, at least one upper support element extends from one element 12*a* or 12*b* and interengages or interlocks with the other element 12*a*, 12*b* to support the corresponding end portion of rod 41. At least one other upper rod supporting projection also provides support for the corresponding end portion of rod 41 in the manner of a cantilever beam supported by only one of the elements 12*a* or 12*b*. A similar multiplicity of projections extend outwardly of the elements 12*a* and 12*b* adjacent a lower side of the opposed end portions of rod 41 to provide support therefor, at least one of such projections extending from one of the elements 12*a* and 12*b* to provide such lower support of rod 41 in the manner of a cantilever beam, and at least one other of the lower support projections extending from the other of elements 12*a* and 12*b* to provide support for the rod 41 end portion in the manner of a cantilever beam.

Also included within the interior portions 42 of elements 12*a* and 12*b* are positioning and retention structures 112 which include upstanding laterally spaced partitions 114 to receive and retain the hook-eye portion 40 of stem 32 when assembled with the rod 41 as shown. Partitions 114 retain and position hook-eye portion 40 without inhibiting movement thereof upon pivoting of stem 32 to the various use positions of handle 14 as above described.

Still further, elements 12*a* and 12*b* include integrally molded pins 116 and corresponding bosses 118 having respective openings 120, each opening 120 being of the size and form to receive the outermost end of the respective pin 116 of the other member 12*a* or 12*b*. Accordingly, in assembly of elements 12*a* and 12*b* as shown in FIG. 4, not only are pins 100 received within openings in bosses 110, additionally pins 116 are received in corresponding openings 120 of bosses 118. The respective outermost ends of pins 116 and 100 are formed to be received within the openings of respective bosses 108 and 118 in the manner to be tightly gripped therein, for example a snap fit or similar structural arrangement whereby pressing the elements 12*a* and 12*b* together with rod 41 and stem 32 assembled therein as shown produces a permanent adjustable handle assembly with the required support for rod 41 provided by the mating and interengaging pin structures within the confines of the assembled elements 12*a* and 12*b* as above described.

As will be seen on references to FIGS. 1 and 2, stem 32 is free to travel within the cross groove structure defined atop the assembled members 12*a* and 12*b* to the various use positions of handle 14. In particular, pivotal movement of stem 32 from side to side within groove 44 merely involves tipping the hook-eye portion 40 of stem 32 with respect to the axis of rod 41. The interior periphery of hook-eye portion 41 is to be large enough to accommodate such movement freely, and the confinement of partitions 114 on the laterally opposed sides of the hook-eye portion 40 is to such as to also accommodate such movement.

For assembly of the above-described structure, rod 41 is inserted through hook-eye portion 40 of stem 32 and is then inserted into position in one of base elements 12*a* and 12*b*. The other of elements 12*a* and 12*b* is then aligned with its mate and the two elements 12*a* and 12*b* forced together to interengage the respective pins 100 and 116 in the openings on bosses 110 and 118. In this configuration the various pins 100, 102, 104, 106 and 108 also are cooperably located, as above described, to support rod 41 within the interior confines of the head assembly 12 and to thus retain stem 32 with respect to the head assembly 12. Threaded plug 36 of stem assembly 34 is then threaded into bore 38 of handle 14 sufficiently to engage plug 36 therein.

According to the description hereinabove the present invention provides an improved adjustable handle implement in which a handle portion is adjustable with respect to a base assembly whereby highly diverse tool configurations are possible. Furthermore, the improved base structure and adjustment stem assembly, as described, provide enhanced assembly and material economy as well as improved ease of operation, reliability, and service life.

Although the invention has been described with reference to a presently preferred embodiment thereof, the invention also may be practiced in various alternative and modified embodiments without departing from the broad spirit and scope thereof. For example, the wire stock diameter may vary from the specified limits so long as operation of the described apparatus is not impaired thereby; the handle may be provided with a textured surface for improved ease of gripping, and the like. These and other alternative and modified embodiments having been contemplated, it is intended that the invention should be construed broadly and limited only by the scope of the claims appended hereto.

I claim:

1. In a hand implement assembly, the combination comprising:

a base means having a plurality of surfaces, at least some of which are oriented in differing planes with respect to one another;

handle means having a butt end surface which is adapted to be fixed selectively in abutting engagement with ones of said surfaces, respectively;

selectively adjustable stem means cooperably retained with respect to said handle means and said base means to selectively retain said butt end surface of said handle means in firm abutting engagement with any of said surfaces to define a plurality of positions of said handle means with respect to said base means;

a retention means which is enclosed within said base means and is cooperable with said stem means for retaining said stem means with respect to said base means;

opening means communicating within said base means between said retention means and said plurality of surfaces, respectively, to accommodate movement of said handle means selectively to said plurality of positions, respectively, while said stem means is retained with respect to said base means;

said base means including a pair of mating portions which are mutually cooperable in assembly with each other to form at least a portion of said base means, said mating portions having recess means for receiving said retention means and said mating portions closing said recess means upon assembly with each other in mating relation to retain said retention means with respect to said base means; and each said mating portion including a plurality of elongated pin means extending therefrom, said pin means of the respective said mating portions being mutually cooperable to form said recess means upon assembly of said mating portions.

2. The combination as set forth in claim 1 wherein said retention means is an elongated means and said plurality of elongated pin means in at least one of said mating portions includes at least a pair of said pin means which are spaced apart to receive said elongated means therebetween to support said elongated means with respect to the respective one of said mating portions.

3. The combination as set forth in claim 1 wherein at least one of said elongated pin means is supported in the assembled configuration of said pair of mating portions solely by the respective one of said mating portions and without engagement by the other of said mating portions.

4. The combination as set forth in claim 1 wherein said mating portions include essentially identical arrangements of said elongated pin means.

5. The combination as set forth in claim 1 wherein said stem means includes an elongated hook means having an open hook-eye end portion and an elongated shank means extending from said open hook-eye end portion, said shank means having a plug means with thread means formed on a peripheral portion thereof for engagement with cooperating thread means provided on said handle means.

6. The combination as set forth in claim 5 wherein said retention means includes an elongated rod means and said open hook-eye means includes a gap means which is cooperable with said rod means to permit said rod means to be passed laterally therethrough into and out of engagement with said open hook-eye means.

7. The combination as set forth in claim 5 wherein said elongated hook means is formed of metallic wire having an outside diameter of approximately 0.075 inches to approximately 0.125 inches.

8. The combination as set forth in claim 7 wherein said elongated hook means is metallic wire having an outside diameter of approximately 0.105 inches.

* * * * *